Dec. 6, 1960
B. J. GUNDLACH ET AL
2,962,815
TILE CUTTING TOOL
Filed Aug. 8, 1958
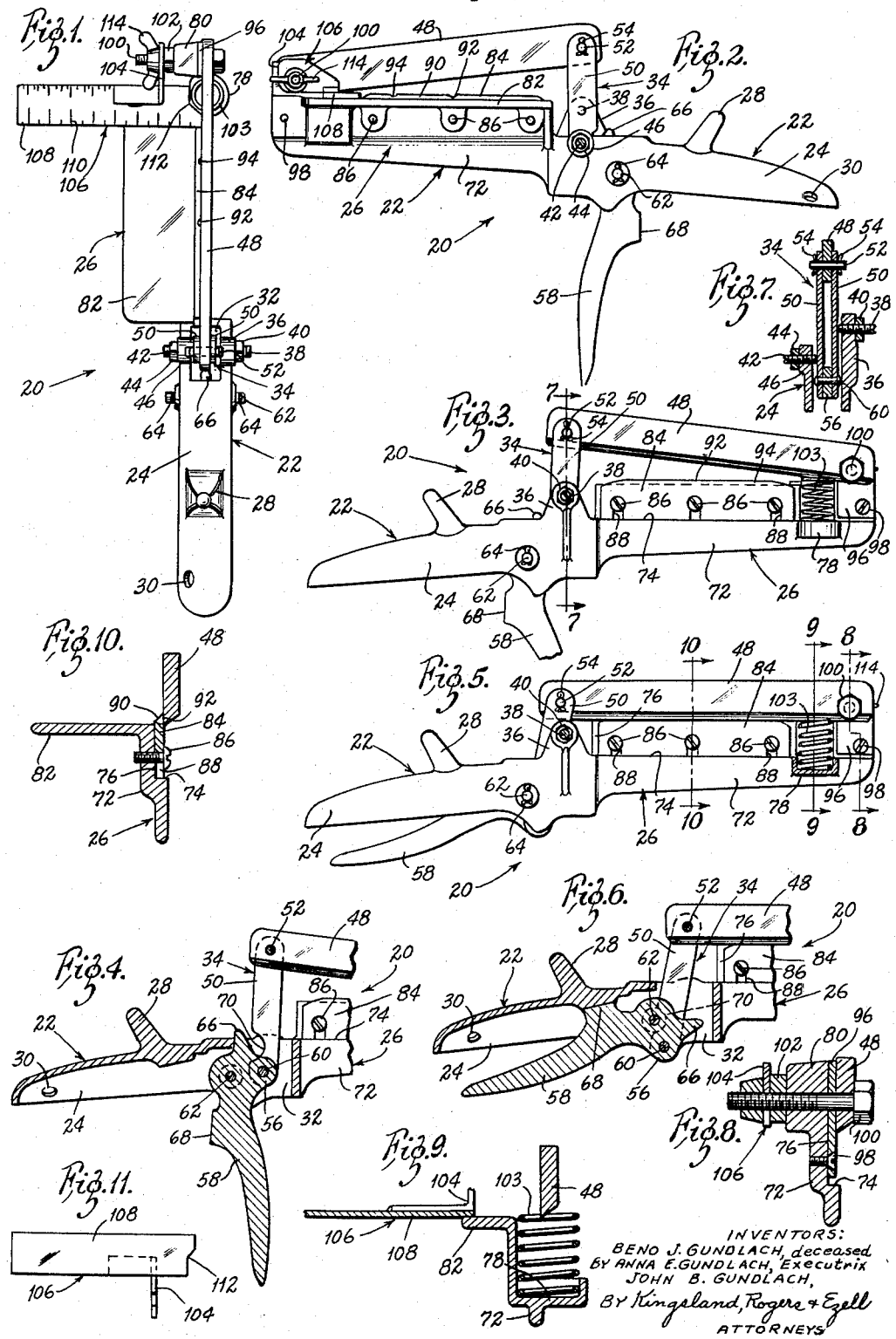
INVENTORS:
BENO J. GUNDLACH, deceased
BY ANNA E. GUNDLACH, Executrix
JOHN B. GUNDLACH,
BY Kingsland, Rogers & Ezell
ATTORNEYS United States Patent Office 2,962,815
Patented Dec. 6, 1960

2,962,815

TILE CUTTING TOOL

Beno J. Gundlach, deceased, late of Belleville, Ill., by Anna E. Gundlach, executrix, and John B. Gundlach, 3 Alhambra Court, both of Belleville, Ill.; said Anna E. Gundlach assignor to said John B. Gundlach Filed Aug. 8, 1958, Ser. No. 754,010

10 Claims. (Cl. 30—251)

The present invention relates generally to shearing devices, and more particularly to a novel tile cutting tool which is held in the hand of the operator during its use and which incorporates novel elements for accurate alignment of the tile in the tool and for precise cutting of the aligned tile.

In brief, the present invention contemplates a hand tool which is adapted particularly for the cutting of wall tiles such as polystyrene plastic tiles, which conventionalily are formed with ridges around the edges and across the back side. These ridges must, of course, be accommodated in the cutting tool in order to prevent the relatively brittle tile from shattering.

It has been a problem heretofore to provide a hand tool capable of providing an accurate straight line shear over the full width of such irregularly shaped tiles. As a result, the only efficient cutters which have been available have been heavy units which, although portable, must rest upon the floor or a like support during their operation. A tool that can be held and operated in the hands of the workman is highly advantageous in providing a more efficient, comfortable, and generally desirable implement than has heretofore been available.

A principal object of the invention, therefore, is to provide a plastic wall tile cutter that can cut while being held in the hands of the operator.

It is an object of the present invention to provide a novel hand tool for cutting wall tile and the like to precise predetermined dimensions.

It is another object of the present invention to provide a novel hand tool for cutting tile which employs a movable shearing blade and having adjustable means for guiding the movable blade in its shearing movement.

It is another object of the invention to provide a novel hand tool for cutting tile which incorporates a stationary blade and a guided movable blade and having a spring returned mechanical linkage for operating the movable blade.

It is another object of the invention to provide a novel hand tool for cutting tile and the like which incorporates removable gauge and guide means.

The foregoing, along with additional objects and advantages, will be apparent from the following description of a specific embodiment of the invention as illustrated in the accompanying drawing, in which:

Figure 1 is a top plan view of a hand tool constructed in accordance with the teachings of the invention;

Figure 2 is a side elevation thereof as viewed from the left of Figure 1;

Figure 3 is a side elevation thereof as viewed from the right of Figure 1, a portion of an operating lever being broken away to conserve space on the drawing;

Figure 4 is a fragmentary vertical section generally similar to Figure 3, showing details of the operating linkage;

Figure 5 is a side elevation similar to Figure 3, but with the tool shown in operated condition;

Figure 6 is a fragmentary vertical section generally similar to Figure 4, but showing the tool in operated condition;

Figure 7 is a vertical section taken generally along the line 7—7 of Figure 3, showing details of an adjustable guide arrangement for the movable cutting blade;

Figures 8, 9, and 10 are enlarged vertical sections taken generally along the lines 8—8, 9—9, and 10—10, respectively, of Figure 5, showing details of assembly of the parts comprising the cutting tool; and Figure 11 is a bottom plan view of a removed gauging device.

Referring more particularly to the details of the drawings as indicated by reference characters, the numeral 20 designates generally a hand tool conforming to the present invention. The tool 20 has a main frame member 22 of elongated form comprising a rear handle portion 24 and a forward bed portion 26. Preferably, the member 22 is of cast construction.

The handle portion 24 is shaped generally to fit the hand of the operator and, as shown in Figures 4 and 6, is generally hollow on the underneath side. An upstanding lug 28 is provided centrally of the portion 24 to aid the operator in grasping and operating the tool. A hole 30 is provided at the rear end of the portion 24 for optional use in hanging the tool 20 from the person of the operator.

As best shown in the plan view of Figure 1, the forward end of the handle portion 24 has a rectangular opening 32 for the accommodation of an operating linkage shown generally as 34. An integral stanchion 36 extends upwardly from one side of the rectangular opening 32, as clearly shown in Figures 2, 5 and 7, and mounts a set screw 38, along with a jamb nut 40, for a purpose to be explained hereinafter. A set screw 42 and jamb nut 44 are also provided on the opposite side of the rectangular opening 32, as illustrated in Figures 1 and 2. However, it will be observed that the latter threaded elements are disposed in a boss 46 substantially at the level of the top of the handle portion 24. Figure 7 shows the relationship between these parts.

The linkage 34 has for its primary function the movement of a pivoted shearing blade 48. Thus, the linkage 34 comprises a pair of identical link elements 50 which embrace the swinging end of the blade 48 and are pivotally engaged therewith by means of a pin 52 secured by cotter pins 54. At their lower ends, the link elements 50 embrace a lug 56 formed on a lever member 58. A pivot pin 60 provides a pivoted connection between the lever 58 and the link elements 50. It is of course clear that a single link element 50 could be employed in place of the illustrated double link arrangement.

As is clear from the several figures of the drawing, the lever 58 is pivotally mounted in the handle portion 24 by means of a pivot pin 62 which passes through the side walls of the portion 24 and is retained by cotter pins 64. In addition to the lug 56 which provides offset attachment for the links 50, the lever 58 has a projection 66 which limits the opening pivotal movement of the lever 58, as illustrated in Figure 4, and a pad 68 which limits the closing movement of the lever 58, as illustrated in Figure 6. Figures 4 and 6 also illustrate the purpose of notches 70 provided in the links 50, the purpose being, of course, to eliminate interference with the pivoted attachment of the lever 58 to the handle portion 24.

Referring once more to Figure 7, it will be obvious that the set screws 38 and 42 may be adjusted to bear against the outside surfaces of the respectively adjacent links 50. The significance of this arrangement will appear hereinafter.

Directing attention now to the bed portion 26 of the member 22, a main vertical web 72 extends forwardly of the handle portion 24 as clearly illustrated in the side elevations depicted in the drawing. The upper portion of the web 72 is offset to provide a longitudinal ledge 74 and a planar offset vertical surface 76 (Figures 8 and 10). At a point near the forward end of the ledge 74 the surface 76 is relieved or cut back slightly and an integral cup-like portion 78 (Figures 3, 5, and 9) is provided. At the extreme forward end of the bed portion 26, an integral boss portion 80 is provided in upstanding relationship to the upper edge of the web portion 72. Finally, the bed portion 26 includes an integral shelf-like lateral extension 82 which extends from the handle portion 24 forwardly to the upstanding post or boss 80.

A stationary shearing blade 84 is secured to the planar surface 76 by means of screws 86 extending through open slots 88 in the blade 84 and threadedly engaging the web 72. The lower edge of the blade 84 may, of course, rest upon the ledge 74, or it may be adjusted upwardly therefrom and secured in desired position by means of the screws 86. The upper edge of the blade 84 is preferably beveled as shown at 90 in Figure 10 and is, for the most part, formed as a straight sharp edge. There is provided, however, a small notch 92 at the approximate middle of the edge 90 and a second notch 94 at a point intermediate the notch 92 and the forward end of the blade 84. In addition to this, both the forward and the rear end of the edge 90 are sloped downwardly as clearly illustrated in Figure 3. It may be mentioned also that the total length of the stationary blade 84 conforms to the principal dimension of a square tile or the like to be operated upon by the tool 20.

The planar face 76 of the web 72 is carried forwardly beyond the cup portion 78 and is extended to the top of the upstanding post 80. A spacing plate 96 is disposed against this forward portion of the surface 76 and secured thereto by a countersunk screw 98 (Figure 8). The forward or pivoted end of the movable blade 48 is then disposed against the spacing plate 96 and pivotally retained by means of a bolt 100 which extends through the blade 48, the plate 96, and the boss 80 for threaded engagement with a nut 102. A compression spring 103 disposed in the cup-like portion 78 bears also against the lower edge of the pivoted blade 48 to bias it toward an open or raised position.

In addition to securing the pivoted blade 48 to the forward end of the bed portion 26, the bolt 100 extends beyond the nut 102 to receive a slotted bracket portion 104 of a gauging device 106. The device 106, shown removed in Figure 11, comprises a flat scale member 108 provided with scale markings 110 and having one end notched as shown at 112 to clear the compression spring 103 which returns the blade 48 to open position. The gauging device 106 is secured against the face of the nut 102 by means of a wing nut 114.

In use, the tool 20 operates to make straight precise cuts in plastic wall tile and the like. In adjusting the various elements of the tool 20 to obtain the desired precision, it will be evident that the spacing plate 96 must have a thickness such as to dispose the cutting side of the blade 48 in accurate alignment with the forward end of the stationary blade 84. This, however, is not sufficient to assure a straight cut over the full length of the blade 84, inasmuch as the free or swinging end of the movable blade 48 will have a tendency during the shearing action to move laterally away from the stationary blade 84. Thus, the set screws 38 and 42 are adjusted in a manner to position the rear end of the blade 48 in accurate alignment with the stationary blade 84 and, by virtue of their offset relation one to the other, to provide coupled restraint against lateral movement of the rear end of the blade 48.

One other adjustment for accuracy is the facing off of the nut 102 to a precise degree such that the gauging device 106 is accurately indexed with the cutting edge 90 of the stationary blade 84.

In operating the tool 20 to cut wall tile of conventional type, the tile to be cut is laid upon the self portion 82 with one edge against the gauging device 106 and with the ridges which extend around the edges of the tile and across the center thereof disposed over the curved ends of the blade 84 and in the notch 92 thereof, respectively. The tile is then positioned with the desired dimension indicated by the markings 110 on the scale 108 and the movable blade 48 is operated by squeezing the lever 58 toward the handle portion 24. Release of the lever 58 then enables the compression spring 103 automatically to return the blade 48 to open position.

Clearly, there has been provided a hand tool for cutting tile which fulfills the objects and advantages sought therefor.

The foregoing description and the accompanying drawing have been given by way of illustration and example. It is to be understood, therefore, that changes in the form of the elements, rearrangement of parts, and the substitution of equivalent elements, all of which will be obvious to those skilled in the art, are contemplated as being part of the invention, which is limited only by the claims which follow.

What is claimed is:

1. A hand tool for cutting plastic tile and the like comprising: a pair of blades pivotally connected together toward an end of each for relative shearing movement of the cutting surfaces; and means for positioning and maintaining said blades in shearing relationship against lateral forces tending to separate the blades; said means including an adjustable element disposed at either side of one of said blades by which the lateral position of said blade with respect to the other blade can be accurately established.

2. In a hand tool for cutting plastic tile and the like, in combination, a stationary blade, a movable blade, means mounting said blades for shearing cooperation therebetween, actuating means connected to the movable blade for moving the same relative to the stationary blade, and guide means for retaining the movable blade in predetermined shearing relation with the stationary blade, said guide means comprising a plurality of positionable elements for resisting lateral forces tending to effect lateral separation of the shearing blades, the movable blade being pivoted at one end, and the positionable elements being disposed adjacent the swinging end of the movable blade, there being a positionable guide element on each side of the plane of movement of the movable blade.

3. The combination of claim 2 wherein the guide elements disposed on opposite sides of the plane of movement of the movable blade are offset from each other in a direction parallel to said plane and generally perpendicular to the cutting edge of the stationary blade.

4. The combination of claim 3 wherein the guide element closest to the level of the cutting edge of the stationary blade is disposed on the side of the aforesaid plane opposite the side on which the stationary blade is disposed.

5. In a hand tool for cutting plastic tile and the like, in combination, a frame, a stationary knife affixed to the frame, a movable blade pivoted at one end to the frame for shearing cooperation with the stationary blade, an operating lever pivoted to the frame remote from the pivoted attachment of the movable blade, and linkage means interconnecting the operating lever with the swinging end of the movable blade, said frame being provided with guide means for resisting a tendency toward lateral separation of the cutting edge of the movable blade from the cutting edge of the stationary blade during the shearing operation, said guide means being disposed for sliding engagement with the aforesaid linkage means connected to the swinging end of the movable blade.

6. The combination of claim 5 wherein the guide means comprises opposed surfaces mutually offset in a direction generally perpendicular to the cutting edge of the stationary blade for providing a mechanical couple.

7. The combination of claim 6 wherein the linkage means comprises a link pivotally connected to the swinging end of the movable blade and extending generally perpendicular to the cutting edge of the stationary blade, and wherein the opposed offset surfaces of the guide means embrace said link, the surface nearer to the cutting edge of the stationary blade being faced in the same direction as the side of the movable blade which engages the stationary blade.

8. The combination of claim 5 plus a compression spring disposed between the frame and the movable blade for biasing the latter toward open position.

9. The combination of claim 5 plus a gauging device removably mounted on the frame in predetermined relation to the pivot axis of the movable blade.

10. A hand tool for cutting plastic tile and the like comprising, in combination, a frame, a stationary knife adjustably affixed to the frame, said stationary knife having a contoured cutting edge conforming generally to the shape of a tile to be cut, a movable blade having a substantially straight cutting edge for shearing cooperation with said stationary blade, means for operating the movable blade comprising articulating linkage means interconnecting the movable blade with the frame, and guide means adjustably mounted on the frame for guiding the operating movement of the movable blade, said guide means being disposed for cooperation with said linkage means to provide a restraining couple to oppose lateral displacement of the movable blade from the stationary blade during a shearing operation.

References Cited in the file of this patent

UNITED STATES PATENTS

| | | |
|---|---|---|
| 1,082,385 | Zimmerman | Dec. 23, 1913 |
| 1,251,101 | Quigley | Dec. 25, 1917 |
| 1,263,492 | Washburn | Apr. 23, 1918 |
| 1,859,371 | Laukkuff | May 24, 1932 |
| 2,744,323 | Kuhlman | May 8, 1956 |
| 2,766,526 | Pape | Oct. 16, 1956 |
| 2,791,833 | Chudner | May 14, 1957 |